US011858057B2

(12) United States Patent
Bertacche

(10) Patent No.: US 11,858,057 B2
(45) Date of Patent: Jan. 2, 2024

(54) BATTERY-POWERED ELECTRONIC RESISTANCE WELDING MACHINE FOR SHEET METAL REPAIR

(71) Applicant: Telwin S.p.A., Villaverla (IT)

(72) Inventor: Gianmaria Bertacche, Villaverla (IT)

(73) Assignee: Telwin S.p.A., Villaverla (IT)

( * ) Notice: Subject to any disclaimer, the term of this patent is extended or adjusted under 35 U.S.C. 154(b) by 0 days.

(21) Appl. No.: 17/778,875

(22) PCT Filed: Nov. 20, 2020

(86) PCT No.: PCT/IT2020/050290
§ 371 (c)(1),
(2) Date: May 23, 2022

(87) PCT Pub. No.: WO2021/100069
PCT Pub. Date: May 27, 2021

(65) Prior Publication Data
US 2023/0132563 A1 May 4, 2023

(30) Foreign Application Priority Data
Nov. 22, 2019 (IT) .......................... 102019000021975

(51) Int. Cl.
*B23K 11/28* (2006.01)
(52) U.S. Cl.
CPC ..................................... *B23K 11/28* (2013.01)
(58) Field of Classification Search
CPC ....... B23K 11/26; B23K 11/28; B23K 11/115; B23K 11/185; B23K 11/241; B23K 11/258; B23K 11/364; B23K 11/3009
See application file for complete search history.

(56) References Cited

U.S. PATENT DOCUMENTS

| 5,516,997 A | 5/1996 | Hunter | |
| 2005/0218118 A1* | 10/2005 | Kilibarda | B23K 11/315 219/86.25 |
| 2015/0375327 A1* | 12/2015 | Becker | G06T 19/006 219/130.01 |

FOREIGN PATENT DOCUMENTS

| JP | 61-092789 | 5/1986 |
| WO | WO 2011/023688 | 3/2011 |
| WO | WO 2015/040458 | 3/2015 |

OTHER PUBLICATIONS

Machine Translation of Profunser (WO 2011/023688) performed on Feb. 27, 2023 (Year: 2011).*

(Continued)

*Primary Examiner* — Brian W Jennison

(57) ABSTRACT

A battery-powered electronic resistance welding machine for sheet metal repair, comprising a machine unit (10), which includes a handle (12) and an activation and deactivation button (13), at least one first rod (14), which is constrained in a sliding fashion (F) to a terminal (15) of the machine unit (10), which has, at one free end, a ground electrode or tip (16) that comes into contact with at least one metal portion to create an electrical resistance circuit, at least one second rod (17), constrained in a sliding fashion (F) to the terminal (15), which has, at one free end, a welding or terminal electrode or tip (18) for the fixing of repair accessories of the metal portion. There is a rechargeable battery (11) in the machine unit (10), for example a lithium-polymer accumulator, which allows the electronic resistance welding machine to be powered without using the mains power supply.

9 Claims, 1 Drawing Sheet

(56) References Cited

OTHER PUBLICATIONS

International Preliminary Report on Patentability dated Feb. 24, 2022 From the International Preliminary Examining Authority Re. Application No. PCT/IT2020/050290. (13 Pages).

International Search Report and the Written Opinion dated Feb. 9, 2021 From the International Searching Authority Re. Application No. PCT/IT2020/050290. (13 Pages).

Rapporto di Ricerca e Opinione Scritta [Search Report and Written Opinion] dated Aug. 24, 2020 From the Ministero Dello Sviluppo Economico, Direzione Generale Sviluppo Produttivo c Competitivita, Ufficio Italiano Brevetti c Marchi Re. Application No. IT201900021975. (10 Pages).

* cited by examiner by # BATTERY-POWERED ELECTRONIC RESISTANCE WELDING MACHINE FOR SHEET METAL REPAIR

RELATED APPLICATIONS

This application is a National Phase of PCT Patent Application No. PCT/IT2020/050290 having International filing date of Nov. 20, 2020, which claims the benefit of priority of Italian Patent Application No. 102019000021975 filed on Nov. 22, 2019. The contents of the above applications are all incorporated by reference as if fully set forth herein in their entirety.

FIELD AND BACKGROUND OF THE INVENTION

This invention is generally concerned with a battery-powered electronic resistance welding machine for sheet metal repair, particularly suitable for vehicle bodywork repair applications.

Multi-tool stations are still known today for repairs on steel and aluminium vehicle bodywork, using various tools and traction accessories on large dents in bonnets, doors, wheel boxes, etc., and on circumscribed areas (e.g. for hail dents).

This method involves, in particular, a first phase of paint stripping and cleaning the uneven area, the tacking or welding of a washer to couple the mass grip, tracing the location on the bodywork where a series of slotted washers will be aligned and preparing an electrode welding gun in sequence a series of slotted washers that are positioned aligned.

A lever is then inserted into the aligned slots of each washer and, in the case of repair on large areas or areas where distributed traction is required, a traction bar is used, equipped with articulated support feet and suction cups for the stable anchorage to the bodywork without the need for additional fastenings, which is placed at the uneven area and fixed to the traction bar using special hooks.

The uneven part is restored by successive adjustments and traction of the bar.

In case of repair on limited areas, where a distributed traction is required and where the positioning of the traction bar could be problematic, successive tacking and traction operations are normally carried out using special extractor kits (electrodes, multi-hooks, corrugated wires, etc.) and/or using a blowback mass, which is moved by hand, for the traction movements in order to raise and shape the sheet metal.

As said, the traditional multi-tool stations mentioned above comprise generators for capacitive discharge welding of pins and washers, at least one multi-function inductor for localised and controlled sheet metal heating and a series of specific accessories, such as hooks, pins, washers, etc., for sheet metal traction.

All the equipment is therefore extremely complex and cumbersome and above all, requires extensive and significant wiring, placed between the generator, powered by the mains power supply, and the welding gun, considering that this wiring must be prepared in order to allow the passage of extremely high intensity currents (such as those used in these applications, which are variable between 1,000 and 2,000 amperes).

SUMMARY OF THE INVENTION

The aim of the present invention is therefore to remedy the technical drawbacks indicated above and in particular, the main aim of the present invention is to create a battery-powered electronic resistance welding machine for sheet metal repair, in particular vehicle sheet metal, having relatively small dimensions and which at the same time, allows the welding and traction operations necessary for such repair to be carried out efficiently and rapidly.

Another aim of the present invention is to create an electronic resistance welding machine for sheet metal repair that is more manageable, reliable, safe, economical, battery-powered and with reduced weight and dimensions compared to the known art.

These and other aims which will emerge more fully below are achieved by an electronic welding machine for the repair of sheet metal, in particular of vehicles, according to the attached claim 1; further detailed features of the welding machine according to the invention are indicated in the following dependent claims.

Advantageously, the electronic welding machine, which is the object of the invention, comprises a machine unit inside which all the components necessary for operation are housed.

In practice, it is a rechargeable battery-powered tool, such as a lithium-polymer accumulator or other type of accumulator, which does not use mains power and which includes a microprocessor electronic circuit adapted to allow the user to select the energy and tacking power in order to weld the electrode point of slots, washers and/or pins used to repair the aforementioned sheet metal.

A digital panel, installed on board the machine, allows a user to automatically adjust the parameters according to the tool chosen and the material to be welded.

BRIEF DESCRIPTION OF THE SEVERAL VIEWS OF THE DRAWINGS

Further features and advantages of the present invention will emerge more fully from the description of a preferred, but non-limiting, embodiment of the electronic resistance welding machine for sheet metal repair according to the present invention, illustrated by way of non-limiting example in the accompanying drawings, in which.

DESCRIPTION OF SPECIFIC EMBODIMENTS OF THE INVENTION

Figure 1:
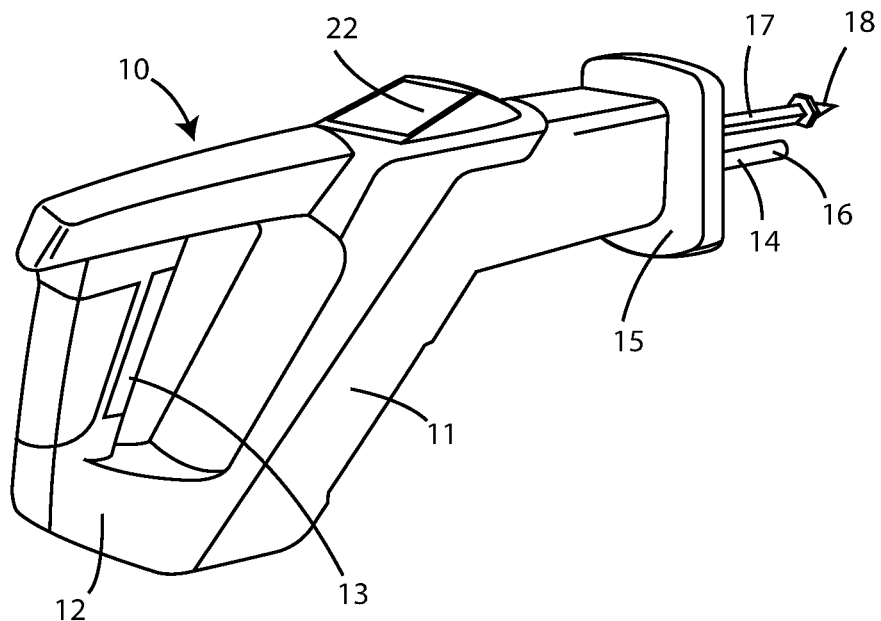
FIG. 1 shows a prospective view of a non-limiting example embodiment of the electronic resistance welding machine for sheet metal repair according to the present invention.
Figure 2:
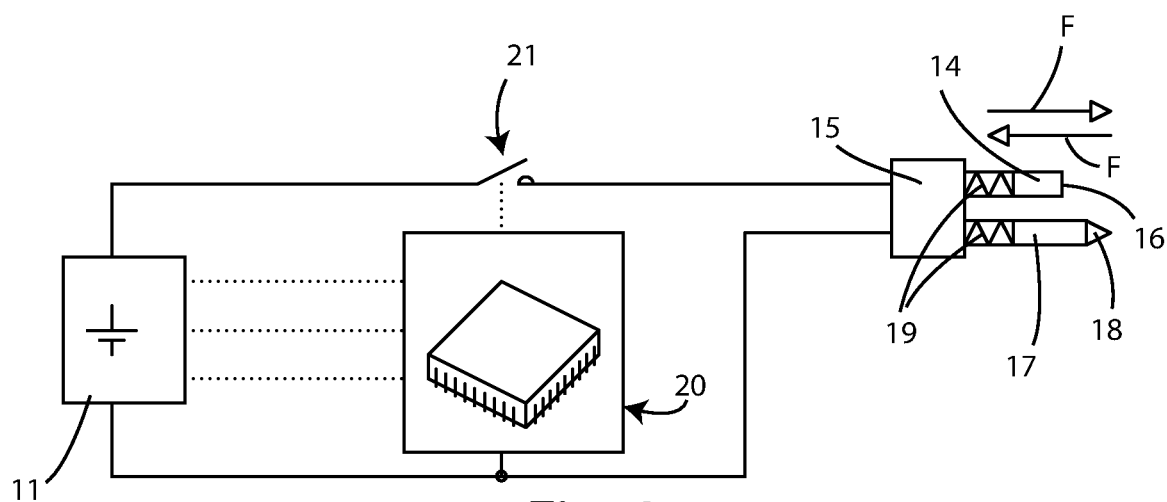
FIG. 2 shows a circuit operation block diagram of the electronic resistance welding machine in FIG. 1, according to the present invention.

With reference to the mentioned FIGS. 1, 2, the electronic welding machine, which is particularly useful for carrying out repairs on metal vehicle bodywork, as well as for extracting and flattening dents in sheet metal, comprises a machine unit 10 with a handle 12 near which at least one button 13 is positioned to activate the machine.

Inside the machine unit 10, which includes the handle 12, there is a rechargeable battery 11, for example a lithium-polymer accumulator, which allows the machine to be powered without the need to use the mains power supply; the rechargeable battery 11 can also be of the extractable type.

The machine unit 10 comprises:

at least one first rod 14, constrained, in a sliding fashion (according to the direction of the arrows F in FIG. 2), with one end and by means of a first elastic element 19, to a terminal 15 of the machine unit 10, which has, at the opposite free end, a ground electrode or tip 16 that comes into contact with a metal portion or sheet metal to create the electrical circuit, and at least one second rod 17, which is also constrained in a sliding fashion (according to the direction of the arrows F in FIG. 2), with one end and by means of a second elastic element 19, to the terminal 15 of the machine unit 10, which has, at the opposite free end, a welding electrode or tip 18 which can be replaced if necessary in favour of fixing the repair accessories (eyelets, hooks, etc.).

The elastic elements 19 are compression loaded and are adapted to counteract the sliding of the rods 14, 17 towards the inside of the machine unit 10.

The ground electrode 16 is preferably made of copper, while the welding electrode 18 preferably comprises a tip made of copper, iron or a slot holder accessory.

The ground electrodes or tips 16 and welding electrodes or tips 18 are constrained to the relative rods 14 and 17 in a removable or permanent fashion.

The ground rods 14 and welding rods 17 are both directly connected to a microprocessor electronic circuit 20, which in turn is directly connected to the rechargeable battery 11 of the machine for its power supply.

Moreover, the microprocessor electronic circuit 20 is directly connected to an electronic device 21 for controlling the welding power and energy; the electronic control device 21 is associated with a digital panel 22, installed on board the machine and available to a user to select the amount of energy and/or power, the duration of welding and the thickness of the sheet metal to be treated.

The ground rods 14 and welding rods 17 are partly housed in corresponding housings or guides of the terminal 15 and are arranged parallel to each other and facing each other at a certain distance. Furthermore, as mentioned, they slide elastically and axially in their respective housings, compared to the machine unit 10, as well as independently of each other.

In order to insulate the ground rod 14 from the machine unit 10, the aforementioned ground rod 14 slides in an insulating pipe with high thermal resistance, inserted in the relevant housing or guide, and in addition, the ground electrode or tip 16 is housed inside an insulating flange.

The welding rod 17 has preferably a polygonal section and is inserted in a guide bush, with a housing having shape corresponding to the section of the rod 17, with anti-rotation function to carry out the traction operations and at the end of the cycle, detach the welding tip 18 from the metal portion on which it is working.

According to the present invention, it is also possible to directly exploit the blowback mass of the machine unit 10, which also includes the weight of the rechargeable batteries 11 on board the machine, by elastically acting on the rods 14, 17 in order to shape the sheet metal and/or carry out the necessary traction operations.

In particular, according to the present invention, the traction operation can be carried out directly with the tip 18, which, thanks to the use of the springs 19, constitutes the traction element of the sheet metal during the repair.

When the springs 19 are loaded, they provide the necessary push to increase the effect of the blowback mass represented by the entire tool complete with rechargeable battery 11.

Finally, the absence of long power supply cables is a considerable advantage from the point of view of energy efficiency, compared to similar products of the traditional type, since the current of 1,000 to 2,000 amperes flows from the battery 11 through the control device 21 only on the terminals of the rods 14, 17, as well as on the tips 16, 18 and on the tip of the metal portion to be melted, which is the welding resistance of the electrical circuit in FIG. 2; such a short current path, without long wiring, consequently results in a truly minimal dissipation.

Further innovative and advantageous features of the invention are the fact that it is possible to use only one tool (the welding gun) rather than a tack welding machine wired with an external generator (thus drastically reducing the overall dimensions and structural and functional complexity of the equipment) and to carry out up to 750 welding points and more (in any case sufficient to carry out the most common types of repairs on bodywork sheet metal) independently, by simply using the built-in rechargeable battery 11 and without the need to connect the machine to the mains power supply.

The characteristics of the electronic resistance welding machine for sheet metal repair, which is the object of this invention, are clear from the description provided, as are its advantages.

They are represented in particular by:
control of the resistance tacking (welding) power;
use of a self-powered microprocessor electronic circuit to control the functions of the welding machine;
use of rechargeable batteries;
use of cushioned rods that favour the tacking and drawing action of the sheet metal;
the machine does not need a power supply;
operating autonomy of up to 750 welding spots and more;
drastic reduction of overall dimensions, compared to the known art;
lightweight structure (less than 3 kg), compared to the known art and by virtue of the advantages achieved;
energy efficiency due to the absence of long power cables.

The invention as it is conceived is susceptible to numerous modifications and variants, all falling within the scope of protection of the appended claims.

Moreover, all the details can be replaced by other technically-equivalent elements; in practice, the materials used, as well as the shapes and dimensions, can be varied according to the contingent requirements and the prior art.

Where the constructional and technical characteristics mentioned in the following claims are followed by signs or reference numbers, the signs or reference numbers have been used only with the aim of increasing the intelligibility of the claims themselves and, consequently, they do not constitute in any way a limitation to the interpretation of each element identified, purely by way of example, by the signs or reference numerals.

The invention claimed is:

1. Battery-powered electronic resistance welding machine for sheet metal repair, comprising
a machine unit (10), which includes a handle (12), and at least one activation and deactivation button (13),
at least one first rod (14) constrained in a sliding fashion (F) by a first elastic element (19) to a terminal (15) of said machine unit (10), said terminal (15) being positioned on the opposite side with respect to said handle (12) and said first rod (14) having, at one free end opposite to said terminal (15), a ground electrode or tip (16) that comes into contact with at least one metal portion to create an electrical circuit, wherein said metal portion is a welding resistance of said circuit,
at least one second rod (17), constrained in a sliding fashion (F) by a second elastic element (19) to said terminal (15) of said machine unit (10), said second rod (17) having, at one free end opposite to said terminal (15), a welding electrode or tip (18) for the fixing of repair accessories of said metal portion, said first and second elastic elements (19) having a sleeve-like shape partially wrapping a respective said first and said second rods (14, 17) and are compression loaded that counteract the sliding movement of said first and second rods (14, 17) towards the inside of the machine unit (10), characterized in that a rechargeable battery (11) is placed inside said machine unit (10), said rechargeable battery (11) being directly connected both to a microprocessor electronic circuit (20) for its power supply and to said first and second rods (14, 17);

said microprocessor electronic circuit (20) is directly connected to said first and second rods (14, 17) which are directly connected to an electronic control device (21) being also directly connected to said rechargeable battery (11);

wherein said microprocessor electronic circuit (20) is adapted to modulate a welding energy and power through said electronic control device (21), and wherein, when said electronic control device (21) is closed, an electrical closed circuit is established, said electrical closed circuit comprises said rechargeable battery (11), said ground electrode or tip (16), said metal portion and said welding electrode or tip (18), wherein said ground electrode or tip (16) and said welding electrode or tip (18) are in contact with said metal portion.

2. Electronic resistance welding machine according to claim 1, characterized in that said rechargeable battery (11) is of an extractable type.

3. Electronic resistance welding machine according to claim 1, characterized in that said electronic control device (21) is associated with a digital panel (22), installed on said machine unit (10) and available to a user to select the quantity of energy and/or power, the duration of the welding and the thicknesses of the metal portion to be treated.

4. Electronic resistance welding machine according to claim 1, characterized in that said first and second rods (14, 17) are partially housed in corresponding housings or guides of said terminal (15) and are arranged parallel to each other and facing at a certain distance, so that they slide elastically and axially in said housings independently of each other.

5. Electronic resistance welding machine according to claim 1, characterized in that said first rod (14) slides in an insulating pipe with high thermal resistance and said ground electrode or tip (16) is housed in an insulating flange.

6. Electronic resistance welding machine according to claim 1, characterized in that said second rod (17) has a polygonal section and is inserted in a guide bush with anti-rotation function during the repair of the metal portion.

7. Electronic resistance welding machine according to claim 1, characterized in that said machine unit (10) and said rechargeable battery (11) consist of a blowback mass of said welding machine during the repair of the metal portion.

8. Electronic resistance welding machine according to claim 7 characterized in that said rod (17) is slidably constrained to said terminal (15) by said elastic element (19) and in that said welding tip (18) of said second rod (17) consists of a traction element of said metal portion during said repair of the metal portion; said elastic elements (19) offering, once loaded, a push to increase the effect of said blowback mass.

9. The Electronic resistance welding machine of claim 1, wherein said rechargeable battery (11) is a lithium-polymer accumulator.

* * * * *